(No Model.)

T. A. EDISON.
SYSTEM OF ELECTRIC LIGHTING.

No. 401,486. Patented Apr. 16, 1889.

WITNESSES:
E. C. Rowlands
H. W. Seely

INVENTOR:
T. A. Edison
by Rich'd N. Dyer.
Att'y

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF ELECTRIC LIGHTING.

SPECIFICATION forming part of Letters Patent No. 401,486, dated April 16, 1889.

Application filed August 7, 1882. Serial No. 68,658. (No model.)

*To all whom it may concern:*

Be it known that I, THOMAS A. EDISON, of Menlo Park, in the county of Middlesex and State of New Jersey, have invented a new and useful Improvement in Systems of Electric Lighting; and I do hereby declare that the following is a full and exact description of the same, reference being had to the accompanying drawings, and to the letters of reference marked thereon.

The object I have in view is to produce a simple and efficient method or arrangement by which incandescing electric lamps may be worked in the same system and be supplied from the same source of electrical energy as arc lamps arranged in series in a circuit having a current of high tension. This I accomplish by taking advantage of the drop in electro-motive force in the circuit caused by the arc lamps, the circuit or circuits for the incandescing electric lamps being connected with the arc-light circuit at points of such difference in potential that the incandescing lamps will receive their proper volts and have the standard candle-power.

Three arrangements for carrying the invention into effect are shown diagrammatically in the accompanying drawings.

G represents the source of electrical energy, which may be one or more dynamo or magneto electric machines.

Figure 1:
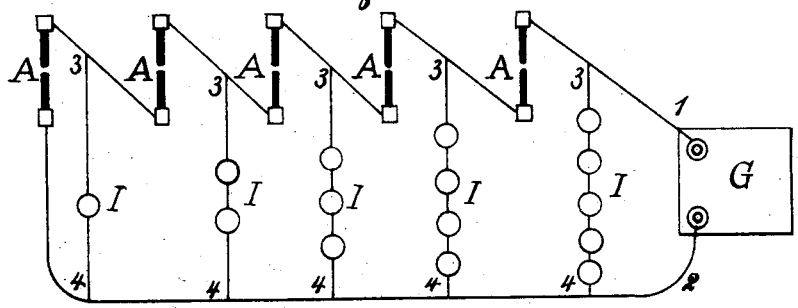

A represents arc lamps arranged in series in a circuit, 1 2, from the generator, such circuit being a complete metallic circuit or employing a ground return. Circuits 3 4 for incandescing electric lamps I may be run across the arc-light circuit from points between the arc lamps to the return wire or ground, as shown in Fig. 1. These circuits 3 4 are provided with different numbers of incandescing lamps, the number depending upon the difference in potential between the points at which the cross-circuits are connected with the arc-light circuit. For purpose of illustration the generator may be considered as having an electro-motive force of two hundred and fifty volts, each arc lamp, Fig. 1, causing a drop of fifty volts.

The incandescing electric lamps may be considered as fifty-volt lamps. Between the ends of the first cross-circuit from the generator there will be a difference in potential of about two hundred and fifty volts. This circuit is connected across the terminals of five arc lamps, each causing a drop of fifty volts; hence five incandescing lamps are placed in this circuit. Since these lamps in the first cross-circuit from the machine form a shunt to all the arc lamps in series in the circuit, they might be considered as being simply in an independent circuit from the machine, and hence are not within the scope of this invention, which relates to placing the incandescent lamps in shunts around one or more arc lamps less than the total number of arc lamps in circuit. Between the ends of the second cross-circuit there will be a difference in potential of about two hundred volts; hence the second cross-circuit has four incandescing electric lamps. There will be a drop of fifty volts at each arc lamp, and hence each succeeding cross-circuit will have one less incandescing lamp, since it is connected across the terminals of one less arc lamp. The last cross-circuit contains but one incandescing lamp. Instead of connecting the incandescing electric-lamp circuits across the terminals of different numbers of arc lamps, as shown in Fig. 1, such circuits may be connected across terminals of single lamps or a definite and equal number of lamps.

Figure 2:
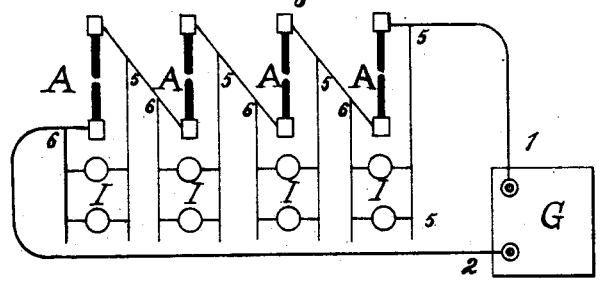

In Fig. 2 each incandescing electric-lamp circuit 5 6 is connected with the arc-light circuit across the terminals of one lamp. The conductors 5 6 of each circuit may have a number of incandescing electric lamps connected in multiple arc therewith.

Figure 3:
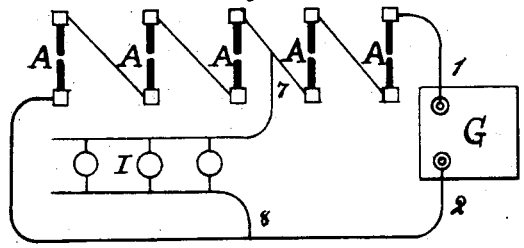

In Fig. 3 an incandescing electric-lamp circuit, 7 8, is connected with the arc-light circuit across the terminals of three arc lamps. The incandescing electric lamps are of higher resistance than fifty volts and are connected in multiple arc, although they may be arranged in multiple series.

It is evident that incandescing lamps of different resistances could be worked from the arc-light circuit by connecting the ends of the incandescing lamp-circuits across the terminals of the requisite number of arc lamps to produce the desired electro-motive force.

It will be understood that as more arc or incandescing lamps are placed in circuit the electro-motive force should be increased.

It will be observed that by arranging the incandescent lamps in shunts around the arc lamps a saving in copper conductors is secured, since it is not necessary to run out a separate circuit from the machine for the incandescent lamps, and in addition a greater degree of independent control of the incandescent lamps is secured, since in running out a separate circuit from the machine the incandescent lamps would have to be put in series in sufficient numbers to accommodate the high electro-motive force, while by shunting around the arc lamps for the incandescent circuits lower electro-motive forces are obtainable.

What I claim is—

1. A system of electric lighting wherein are combined arc lamps arranged in series and incandescing electric lamps connected with the arc-lamp circuit and shunting one or more of the arc lamps, the shunt circuit or circuits being taken around less than the total number of arc lamps in circuit, substantially as set forth.

2. In a system of electric lighting, the combination of a circuit containing arc lamps arranged in series with a number of cross or multiple-arc circuits taken from different points between the arc lamps and incandescent electric lamps located in said independent cross-circuits and adjusted by number and capacity for the different electro-motive forces existing at said several cross-circuits, substantially as set forth.

This specification signed and witnessed this 12th day of June, 1882.

THOS. A. EDISON.

Witnesses:
 RICHD. N. DYER,
 EDWARD H. PYATT.